Dec. 11, 1951 O. WANNEBO 2,577,939

MOUNTING FOR GUARD FINGER WITH LEDGER PLATES

Filed Nov. 3, 1948 4 Sheets-Sheet 1

Inventor

OTTO WANNEBO,

By Robert B. Larson

Attorneys

Dec. 11, 1951 O. WANNEBO 2,577,939

MOUNTING FOR GUARD FINGER WITH LEDGER PLATES

Filed Nov. 3, 1948 4 Sheets-Sheet 2

Inventor
OTTO WANNEBO,

By Robert B. Larson

Attorneys

MOUNTING FOR GUARD FINGER WITH LEDGER PLATES

Inventor
OTTO WANNEBO,

By Robert B Larson
Attorneys

Dec. 11, 1951 O. WANNEBO 2,577,939

MOUNTING FOR GUARD FINGER WITH LEDGER PLATES

Filed Nov. 3, 1948 4 Sheets-Sheet 4

Inventor

OTTO WANNEBO,

Robert B. Larson

Attorneys

Patented Dec. 11, 1951

2,577,939

UNITED STATES PATENT OFFICE 2,577,939

MOUNTING FOR GUARD FINGER WITH LEDGER PLATES

Otto Wannebo, Pine River, Minn.

Application November 3, 1948, Serial No. 58,045

9 Claims. (Cl. 56—309)

This invention relates to a cutter bar assembly for use in reciprocating cutter type mowers, reapers and the like. The invention is characterized by several important features.

One feature of the invention resides in the manner of mounting on the cutter bar, the forwardly extending fingers or guards of the mower. These guards are mounted on the cutter bar by means of bolts which extend from front to rear through the cutter bar, and are held in place by means of nuts or other detachable fasteners positioned at the rear of the bar. One object of the invention is the provision of such a construction.

Another feature and object of the invention resides in the use of a hollow cutter bar which is light in weight, and economical to manufacture. Such a bar is particularly desirable when used with a finger or guard having the front-to-rear mounting as mentioned above.

Another important feature of the invention resides in a cutter bar and guard finger construction using replaceable ledger plates, in which the front-to-rear mounting described above is utilized in holding the ledger plates in place when the arrangement is assembled, the holding of the guard or finger tightly against the forward portion of the bar being thus used for maintaining the detachable ledger plates in place. The plates are removable by loosening the attachment of the guard fingers to the mower bar, followed by a slight forward movement of the fingers with relation to the mower bar, permitting removal and replacement of worn or broken ledger plates. An object of the invention resides in the provision of the feature just described.

According to another feature of the invention, the fingers or guards may be held in place on the mower bar by threaded means which are either integral with the guards, or which are detachable from the guards. Another object of the invention resides in the integral or separable attaching means to which reference has just been made.

Another feature of the invention is found in a novel construction for providing a guideway for the reciprocating member carrying the cutting knives. This guideway is conveniently formed by means of a depression in the upper surface of the hollow cutting bar, and can also be formed by simply attaching a guiding element to the upper surface of the bar. In both cases, a rearwardly facing surface on each guard finger assists in defining the guideway. Other objects of the invention reside in these manners of providing guideways.

Another feature of the invention resides in the provision of a new type of guard for causing the passage of cuttings and other substances over the cutting bar so that they will not fall into, and become entangled with the reciprocating parts. This feature includes a novel construction for bracing the guard by means of engagement of its rear end with the upper surface of the cutting bar. This feature also comprises an object of the invention.

Another feature of the invention is found in the provision of a novel cross-sectional configuration for the guards or fingers, the arrangement being designed to give minimum weight with a large lower surface which rides along the surface being cut. This feature is another object of the invention.

The above and other objects of the invention will be apparent from the following specification, taken in conjunction with the accompanying drawings, in which.

Figure 1:
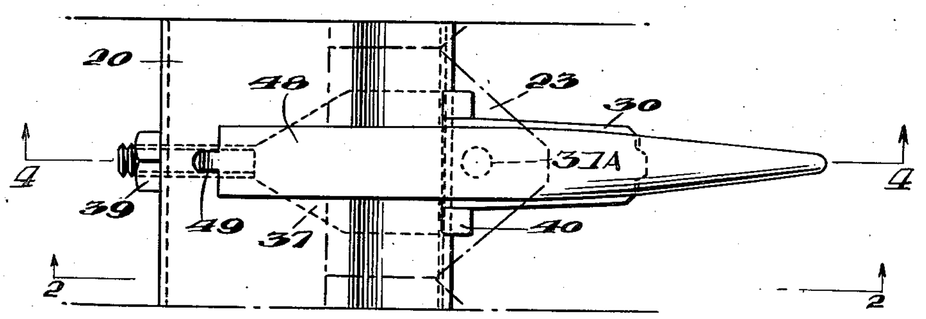
Fig. 1 is a top plan view showing one embodiment of the invention.

Taking up in detail first the embodiment shown in Figs. 1 to 5, there is shown a hollow sheet metal cutter bar 20, conveniently formed from a single piece of sheet metal bent upon itself and welded along a longitudinal seam. The member 20 comprises the fixed cutter bar of a reciprocating mower, and the bar is generally rectangular in a cross-section, except that the upper front corner portion is indented at 21 to form a guideway for the member 22 which reciprocates in a direction parallel to the length of cutter bar 20, and which carries the cutting elements, indicated at 23. An opening 24 is provided in the front wall 25 of the member 20 at each location of a guard finger, these openings being preferably rectangular in configuration. The rear wall 26 of the member 20 is provided with spaced holes 27 which are much smaller than openings 24, but which are aligned therewith.

The openings 24 receive the guards or fingers generally denoted by the numeral 30, and as will be explained presently, these fingers 30 carry detachable ledger plates shown at 31.

The guard fingers 30, one of which is mounted in each of the openings 24, have their forward portions shaped in a conventional manner with a somewhat pointed nose 34 increasing in diameter rearwardly, and merging into a central portion 35. Rearwardly of the central portion is a flat broad portion 36 which tapers at 37 to form a threaded attaching bolt 38. The bolt 38 is adapted to fit snugly within the opening 27 when the guard is inserted through front opening 24 in the member 20, and a nut 39 is then screwed on the threaded portion 38 to hold the guard in place, and to pull it tightly against the forward edge of the bar 20 and, in doing so, to hold the ledger plate 31 in its assembled position, as will be explained presently. The flat portion 36 of the guard 30 is dimensioned to fit snugly within the opening 24, so as to prevent any turning and twisting of the guard 30 during use.

Figure 3:
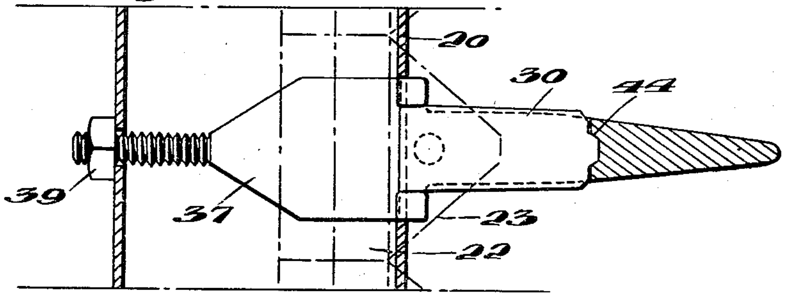
Fig. 3 is a plan view similar to Fig. 1, but with the arcuate upper guard and the upper wall of the cutter bar omitted to show the parts below.

The central portion 35 of the guard has upwardly extending corner portions 40 which are separated by a depression 41 in the upper surface of the guard, and which have undercut rear portions 42. Forwardly of the central portion 35, the surface of the guard comprises a continuation of the depression 41, this surface continuing approximately half the distance to the nose of the guard, where it terminates in an upwardly extending wall 43 having a central indentation 44 (Fig. 3). The surface between depression 41 and wall 43 may be solid, or as shown in Fig. 5, it may be cut away as at 45 to give additional lightness to the structure.

The upper portion of the nose of the guard takes the form of an arcuate upper guard or guide 48 which is integral with the nose of the guard finger 34, and which extends rearwardly, terminating in a reduced portion 49 adapted to enter an opening 50 in the upper surface of the bar 20. This element 48 causes cuttings, branches and the like to pass over the cutter bar more easily, without becoming entangled with the moving parts, and the engagement of the reduced portion 49 with the opening 50 provides an additional bracing for the guard 30 against movement from its ordinary position relative to the bar 20.

Figure 5:
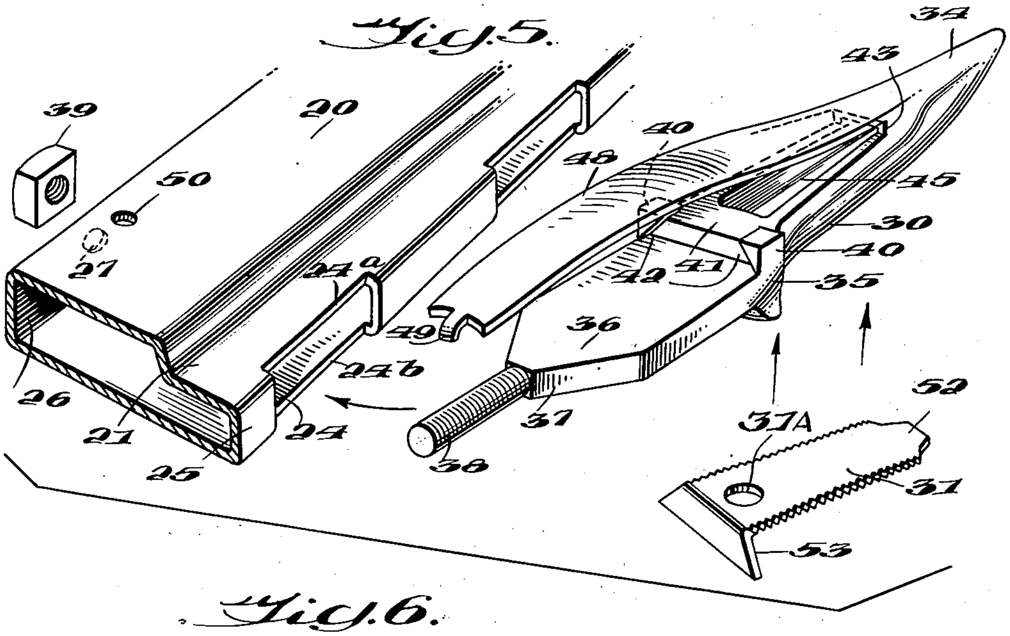
Fig. 5 is an exploded perspective view of the structure shown in Figs. 1 to 4.

The ledger plate 31, as shown particularly in Fig. 5, tapers slightly toward its forward portion, and the extreme nose of the ledger plate comprises a blunted point 52 matching in configuration the indentation 44, so that it can be received in the indentation. At the rear of the ledger plate is a downwardly extending portion 53 which is of greater width at its lower edge than at its upper portion. The flange 53 is dimensioned to fit snugly within the depression formed by the undercut portions 42, and the thickness of the ledger plate and the depth of the depression 41 are such that the upper surface of the ledger plate is substantially flush with the upper surfaces of the portions 40 of the guard when the ledger plate is in operating position. The rear surface of flange 53 is also substantially flush with the rear surfaces of portions 40 at such time.

The abutment formed by the rear surface of flange 53 and the rear surfaces of finger portions 40 abuts against the upper edge **24*a* of the opening 24 when the arrangement is assembled, and the tightening of nut 39 maintains this surface tightly engaged against the edge 24*a* so that the ledger plate cannot move rearwardly. The engagement of the nose portion 52 of the ledger plate with the indentation 44 prevents the forward end of the ledger plate from moving out of its assembled position except by rearward movement of the ledger plate. The undercut arrangement 42 cooperating with the configuration of flange 53 of the ledger plate prevents upward or sideward movement of the ledger plate when it is in its assembled position, so that only when the finger or guard 30 is moved forwardly from its assembled position on bar 20 can the ledger plate be removed from the finger member. Hole 31A is provided to aid in the removal of ledger plate 31**.

Figure 2:
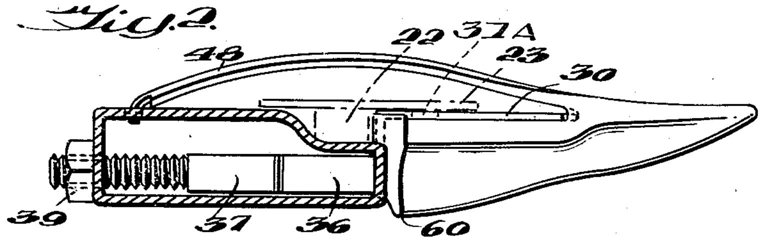
Fig. 2 is a sectional view taken on line 2—2 of Fig. 1.
Figure 4:
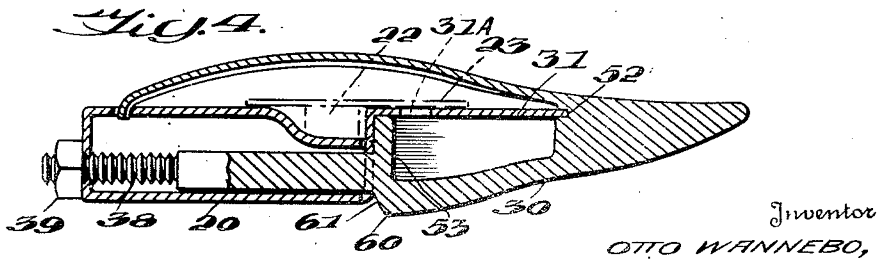
Fig. 4 is a sectional view taken on line 4—4 of Fig. 1.

The undersurface of the nose portion of the guard 30 is shaped as shown in Figs. 2 and 4, moving downwardly from the extreme forward tip of the guard in a smooth curve which causes the cutter to ride easily over obstructions. This lower surface reaches a low point at 60, after which it passes upwardly rather abruptly to form a surface 61 which engages against the lower edge **24*b* of opening 24 so as to anchor this portion of the finger against rearward movement with respect to member 20**.

It should be pointed out that the width of the central portion 35 of the guard is dimensioned with regard to the width of opening 24 so that the sidewalls of the portion 35, 40 of the guard fit snugly between the lateral edges of the opening 24, the upper and lower edges being shown as spaced a short distance behind the line of the forward surface of the cutter bar 20.

In assembling the form of the invention shown in Figs. 1 to 5, the ledger plate is placed approximately in its assembled position, but slightly to the rear of its final position, and is then slid forwardly with respect to the finger, so that the nose 52 passes into indentation 44, and the flange 53 passes within the undercut arrangement 42. The guard and ledger plate are then mounted on the bar 20 by sliding the threaded portion 38, and the flat central portion 36, into the opening 24, and continuing this movement until the threaded portion 38 passes into opening 27, and until the rear surface formed by guard portions 40 and flange 53 of the ledger plate abuts against the upper edge of the opening 24. At this point the surface 61 will abut against the lower edge **24*b* of opening 24. The diminished portion 49 of the upper guard 48 slides along the upper surface of member 20 as the assembling movement takes place, and when it reaches the opening 50, the hook shaped portion 49 enters the opening 50**, which is its normal position when the arrangement is assembled. Nut 39 is then tightened on threaded portions 38 and the guard 30 is then mounted securely in place on the cutter bar 20. This tightening of nut 39 also prevents removal of ledger plate 31, since the cutter bar edge *24a* abuts against the rear surface of the flange 53 of the ledger plate.

It is to be understood that while the upper guard 48 is shown in its arcuate embodiment and in engagement with an opening such as 50 in the cutter bar only in this embodiment this construction can also be used with the other embodiments to be described below.

The construction of Figs. 1–5, and the other constructions shown herein in which the mounting of the fingers or guards takes place by means of a front-to-rear mounting means such as guard portion 36 and threaded portion 38, has the advantage that the fingers can be replaced quite readily in the field without lifting the cutter bar, unless desired, and worn ledger plates 31 can be replaced quickly, simply by loosening nut 39 and sliding the guard forwardly far enough to permit substitution of a new ledger plate.

Figures 6 through 9 show another embodiment of the invention. In this embodiment, the cutter bar as shown at 70, is hollow, and generally rectangular in cross section. A solid bar 71 is welded or otherwise attached to the upper surface of the cutter bar, in order to provide a guide for the reciprocating member (not shown) which carries the cutters. A finger or guard is shown at 73, and it is to be understood that there are a plurality of these guards spaced along the length of the cutter bar 70. Each finger or guard 73 has a removable ledger plate shown at 74.

The cutter bar 70, at the point of attachment of each of the guards 73, has aligned bolt holes 76 and 77 in its front and rear walls, respectively, through each pair of which is adapted to pass a long bolt 78 having an enlarged square head 79. A nut 80 is provided for threaded engagement with the rear end of bolt 78. Bar 70 has on each side of opening 76, additional openings 81 and 82 which assist in aligning and maintaining the guard against displacement as will be explained presently.

Figure 6:
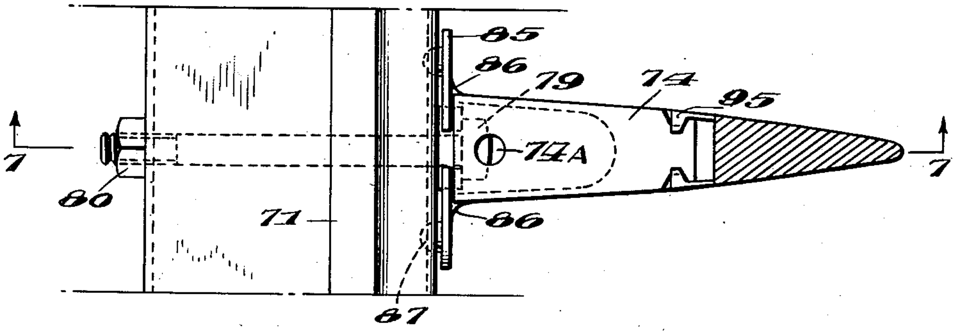
Fig. 6 is a plan view of a second embodiment of the invention in which a separate bolt is used to hold the guard in place.
Figure 7:
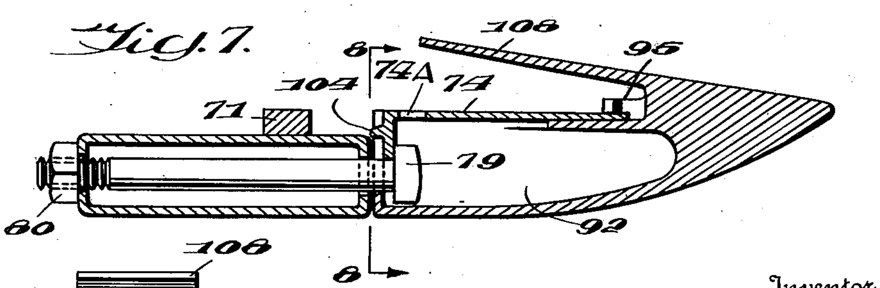
Fig. 7 is a sectional view taken on line 7—7 of Fig. 6.
Figure 8:
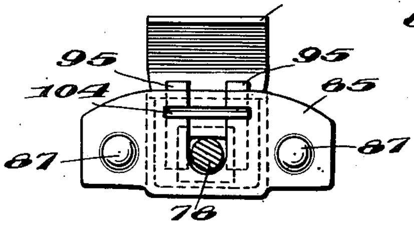
Fig. 8 is a sectional view taken on line 8—8 of Fig. 7.
Figure 9:
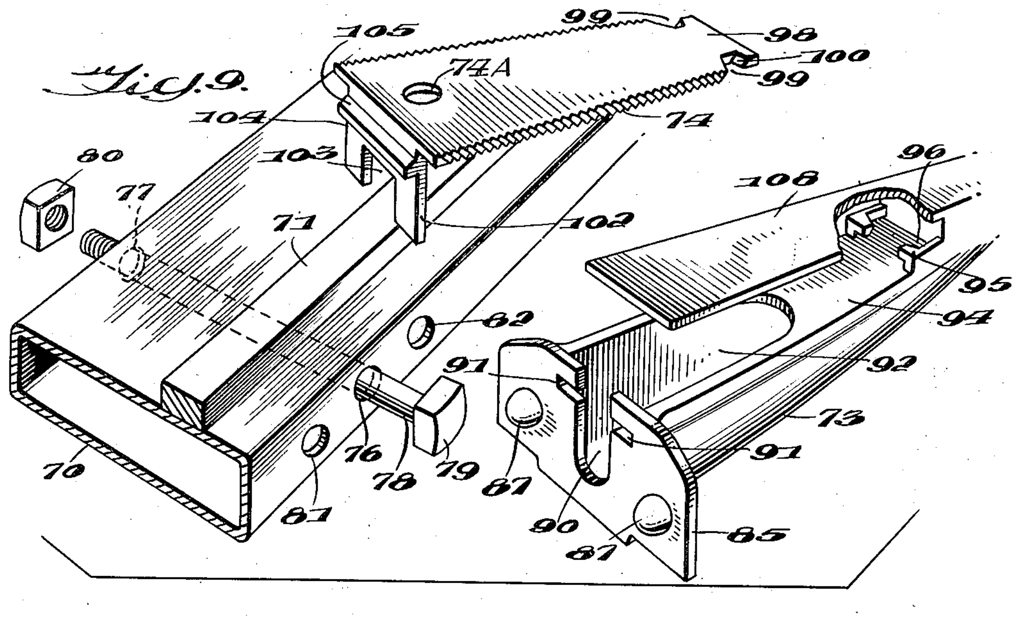
Fig. 9 is an exploded perspective view of the construction shown in Figs. 6 through 8.
Figure 10:
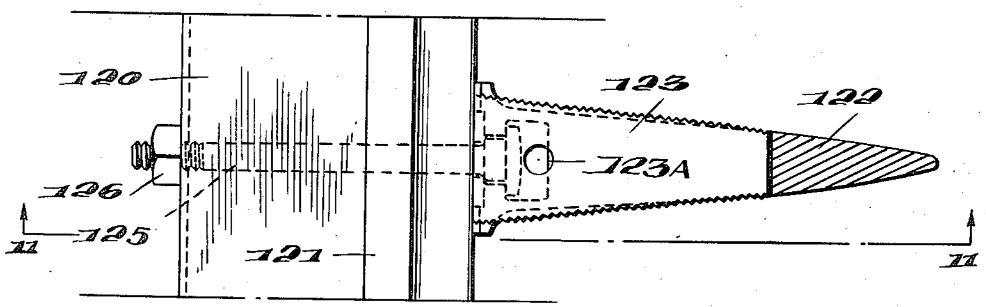
Fig. 10 is a plan view of still another embodiment of the invention.
Figures 11, 12:
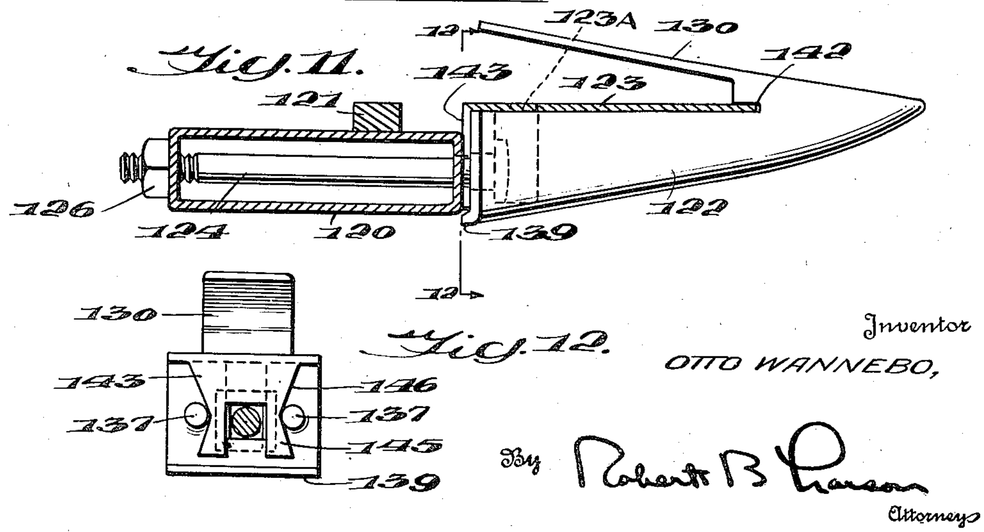
Fig. 11 is a sectional view taken on lines 11—11 of Fig. 10.
Fig. 12 is a sectional view taken on lines 12—12 of Fig. 11.
Figure 13:
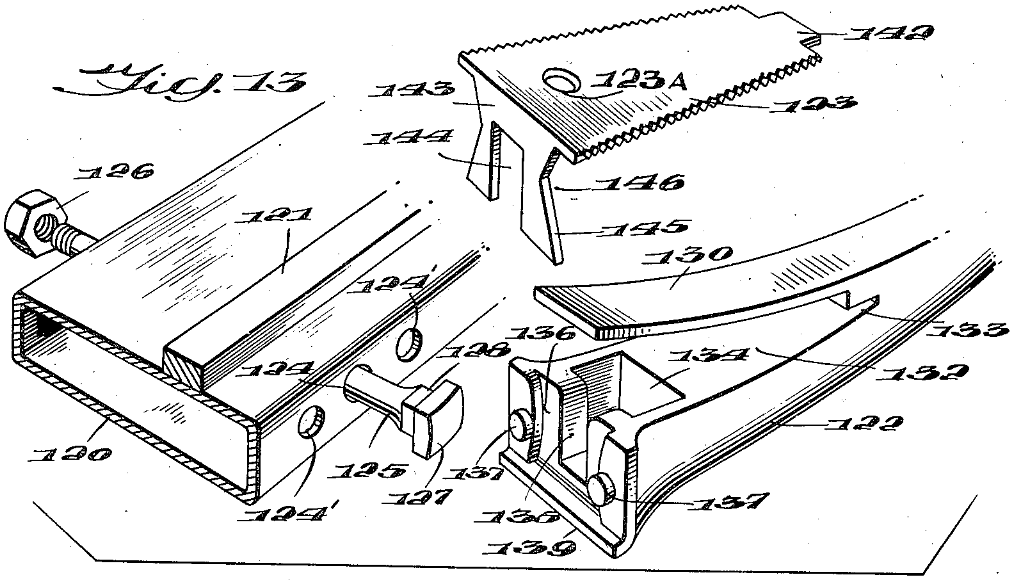
Fig. 13 is an exploded perspective view of the construction shown in Figs. 10 through 12.
Figure 14:
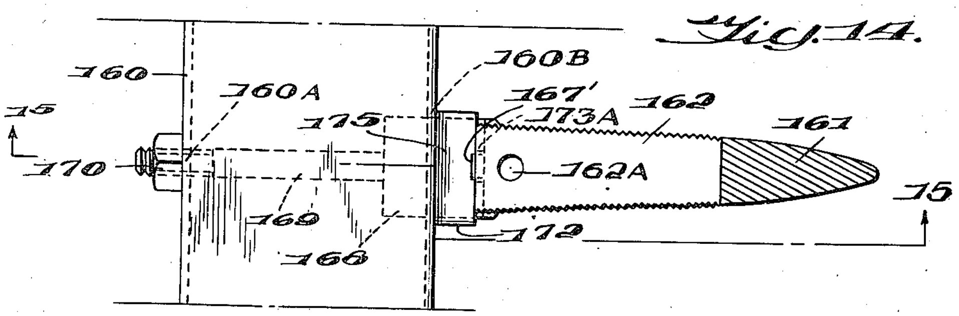
Fig. 14 is a plan view of another embodiment of the invention.

The guard is generally pointed at its forward end as in the case of the preceding embodiment, and the rear portion of the guard is provided with a broad abutment element 85 which may be integral with the finger, or may comprise a separate piece welded or otherwise attached to the finger 73. As shown in Fig. 6, the abutment element 85 is attached by welding at 86. Projections 87 are provided on the rear surface of the abutment element 85 so as to engage openings 81 and 82 on the bar 70 when the guard is assembled on the front edge of the bar. The engagement of the projections 87 in the openings 81 and 82 into which they fit serves to locate the guard with accuracy, and to prevent rocking or other movement of the guard about its longitudinal axis relative to the cutter bar.

The abutment element 85 has a central notch 90 extending downwardly from the upper edge of element almost to its lower edge. Near the upper end of the notch, two lateral notches 91 are provided, one on each side of the notch 90. The notch 90 communicates with a cavity 92 in the interior of the guard 73.

The ledger plate receiving surface of guard 73 is flat in its forward portion at 94, and this flat portion ends approximately two-thirds of the way to the rear of the guard, so that the cavity 92 within the guard is open at the top. At the front of the surface 94, there are two spaced ledger plate holding projections 95 which project inwardly toward each other, and thereby define a forward portion of the ledger plate receiving space as shown at 96. Projections 95 are undercut slightly from their forward edges so as to receive beveled edge portions of tongue 98 of ledger plate 74, as will be described presently.

The ledger plate 74 comprises a flat plate having a forwardly tapering body portion, and provided with notches 99 on each of its lateral edges near its extreme forward end. Notches 99 define a tongue 98 provided with beveled rear edge portions 100 which slide partially below the undercut portions of projections 95 when the ledger plate is assembled on the guard.

At its rear edge, the ledger plate 74 has a downwardly extending flange 102, smaller in width than the rear edge of the ledger plate. Flange 102 may be integral with the ledger plate, or may be attached thereto, as by welding, and the flange has a central notch 103 which is open at the lower edge of the flange. This notch 103 is dimensioned so as to fit over the shank of bolt 78, but to prevent passage of the bolt head 79 through the notch, as shown in Fig. 6. The flange also has a rearwardly extending lip 104 near the point of its juncture with the ledger plate, the lip 104 preferably being slightly beveled along its upper rear edge, as shown at 105.

Lip 104 is dimensioned so as to fit within the space provided by the two notches 91 which extend from the central notch 90 in the guard, as described above.

The guard finger 73 has an upper guard 108 which comprises a thin integral portion of the guard extending from the nose of the guard rearwardly, and overlying the surface 94. Shield or guard 108 in the embodiment shown, is roughly of the same length as the guard finger itself, but if desired, the shield can be extended rearwardly in the same manner as the shield 48 in the embodiment of Figs. 1 to 5.

In assembling the structure shown in Figs. 6 to 9, the bolt head 79 is placed in cavity 92 in the guard finger with the bolt shank 78 extending rearwardly through notch 90. Ledger plate 74 is then slid into place beneath shield 108, with the flange 102 positioned within the hollow interior 92 of the guard between the front surface of abutment member 85 and the rear surface of bolt head 78, and with the tongue 98 positioned in the space 96 forwardly of projections 95. This space 96 is sufficiently larger in size from front to rear than the tongue 98, to permit the tongue to be placed in the space 96 and then slid to the rear in order to engage the beveled portions 100 of the tongue below the undercut portions of projections 95.

The ledger plate may then be slid into its final position, which entails moving of lip 104 into the notches 91, and moving of the beveled portitons 100 of tongue 98 into the undercut portions of projections 95, both by means of a short rearward movement of the ledger plate. This rearward movement causes the rear surface of flange 102 of the ledger plate to be positioned against the front surface of abutment element 85 of guard 73. Such movement may be accomplished by hand, or simply by tightening nut 80 on bolt 79, since this movement is accomplished, or more properly, completed, by the final tightening of the nut 78 and bolt 90, which tightening serves to hold the ledger plate firmly in place on the guard 73, and to hold the guard 73 firmly in place along the front edge of the cutter bar 70. Hole 74A is provided to assist in the handling of ledger plate 74.

In this embodiment of the invention, a broken or bent guard 73 can be replaced quickly by simply loosening nut 80 sufficiently to permit the removal of the ledger plate 74, followed by removal of the guard from its position about the head of the bolt, after which a new guard can be slid into place, the ledger plate replaced, and the nut again tightened. The same procedure, omitting the removal of the guard 73, is followed for replacement for a worn ledger plate 74. This arrangement has the advantage that in case the threads on bolt 78 are stripped, or the bolt otherwise damaged, a new bolt may be substituted, rather than substituting a whole new guard, as would be the case where the bolt 78 is a part of the guard.

In the embodiment of the invention just described, the guideway for the reciprocating member which carries the cutting elements (not shown), is provided by the forward edge of bar 71 and the rear surface of abutment element 85 (see Fig. 7), together with the front portion of the upper surface of the cutter bar.

Another embodiment of the invention is shown in Figs. 10 through 13, wherein the hollow cutting bar is shown at 120. A member 121 is shown attached to the top surface of the cutting bar 120 to provide a rear guide for the reciprocating element (not shown) which carries the cutting elements, a finger being shown at 122 and a ledger plate at 123.

Cutting bar 120 has aligned openings in its front and rear walls, one of which is shown at 124, and a bolt 125 is adapted to pass into these openings and to be held therein by a nut 126 which lies adjacent the rear wall of the cutter bar when the structure is assembled. Bolt 125 has an enlarged head 127, and may also have a smaller shank portion 128 adjacent the head, preferably provided with opposed flat sides.

Each finger 122 is generally pointed as in the case of the previously described embodiments, and has an upper guard element 130 which is separated from the body of guard 122 by a space within which the ledger plate 123 is located, and in which the reciprocating cutting elements (not shown) are located. The ledger plate 123 is received on a flat surface 132 on the finger or guard, and the extreme forward portion of this surface is of diminished depth at 133 for a purpose which will be described presently.

At its rear portion, the guard 122 has a cavity 134 which defines the rear edge of surface 132. This cavity opens to the rear end of the guard through a notch 135 which is dimensioned to receive the flat sided shank 128 of bolt 125 so as to prevent rotation of the bolt. The rear surface of the guard is cut away somewhat at 136 on each side of the notch 135, and on each side of the cut-out portion 136 there is a projection 137. The lower edge of the rear surface of guard 122 is curved rearwardly to form a lip 139.

The ledger plate 123 has a main body portion which conforms generally to the shape of the surface 132 of the guard, and the forward end of the ledger plate is narrowed somewhat to form a tongue 142 which is adapted to be positioned within opening 133 at the forward end of surface 132. The rear portion of the ledger plate is provided with a downwardly extending flange 143 having a central notch 144 for alignment with notch 135 of the guard, and on each side of notch 144 the flange is flared outwardly at 145 to provide a notch 146 in each lateral edge. The shape of the flange 143 is thus such as to fit snugly within the cut-away portions 136 on the rear surface of the guard, with the rear surface of flange 143 being substantially flush with the rear surface of the guard. Hole 123A is provided to aid in the handling of ledger plate 123.

The cutter bar 120 has on each side of opening 124, openings 124′ for receiving the projections 137 which serve to prevent twisting movement of the guard 122 relative to the bar 120 after assembly.

In assembling the structure, the bolt head may be placed in cavity 134, and ledger plate 123 is then placed on the surface 132 with its notch 144 about the bolt, after which the ledger plate 123 is slid forwardly a short distance to engage tongue 142 within the space 133 and to move flange 143 into the cut-out portion 136, leaving the rear surface of flange 143 flush with the rear surface of the guard. The bolt may then be slipped into the appropriate openings 124 in cutter bar 120, if it has not already been so positioned, and by tightening nut 126, the rear surface of guard 122 is urged into tight engagement with the front surface of the cutter bar 120, the projections 137 being located in holes 124′, and lip 139 being positioned under the extreme forward edge portion of the cutter bar 120. This rearward urging of guard 122 thus holds the ledger plate 123 firmly in position, since the ledger plate cannot be removed except by rearward movement relative to the guard.

In order to replace any of the elements, nut 126 is simply removed and bolt 125 slid forwardly to permit sufficient rearward movement of ledger plate 123 relative to guard 122 to clear flange 143 of its engagement in cut-out portions 136, and to move tongue 142 of the ledger plate out of space 133. In this way a new ledger plate may be substituted for a worn one, or a broken guard or bolt may be replaced without delay.

Another embodiment of the invention is shown in Figs. 14 to 17, in which the cutter bar is shown at 160, the guard or finger at 161, and a ledger plate at 162. The cutter bar 160 has openings in its front and rear wall, the rear opening 160A being circular, and the forward opening 160B being rectangular, its greater dimension being in the direction of the length of the cutter bar 160.

Figure 16:
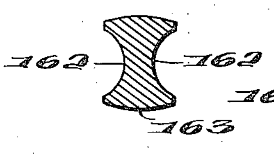
Fig. 16 is a sectional view taken on line 16—16 of Fig. 15.
Figure 17:
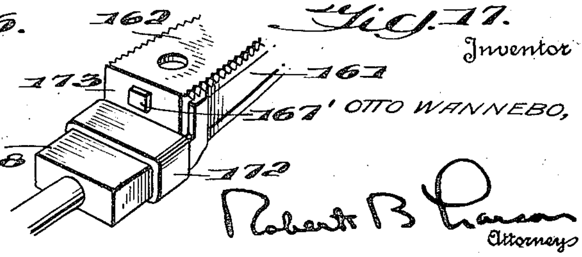
Fig. 17 is a detail perspective view of the rear end portion of the finger and ledger plate shown in Figs. 14 and 15.

Guard 161 is of the usual generally pointed shape, and as shown in Fig. 16, is somewhat hollowed on each side at 162 for lightness and to form a lower surface 163 which is of considerable area to facilitate movement of the guard along the ground.

Figure 15:
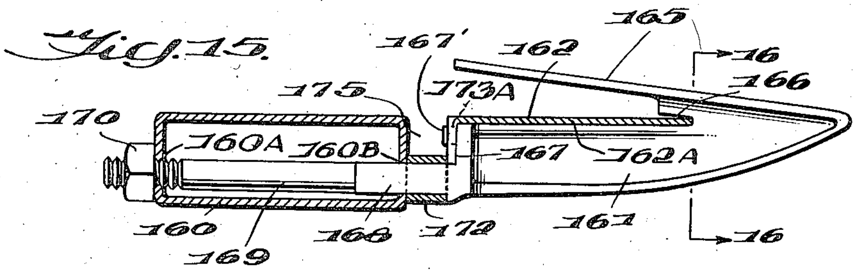
Fig. 15 is a sectional view taken on line 15—15 of Fig. 14.

Guard 161 has an upper guard portion 165 which is spaced from the lower part of guard 161 to provide an opening for receiving ledger plate 162 and the cutting elements (not shown). The forward portion of the space between the body of the guard 161 and the upper guard portion 165 is of diminished depth, as shown at 166, to receive the forward end of ledger plate 162 (Fig. 15).

At its rear end, guard 161 has a downwardly extending surface 167 having a projection 167′. Surface 167 terminates in an integral rearwardly extending fastening element which is rectangular in configuration in its forward portion 168, and which is formed as a threaded bolt at its rear portion 169 to receive a nut 170. The rectangular portion 168 of the guard is shaped so as to fit snugly within the rectangular opening of the front wall of the cutter bar 160, and thereby holds the guard 161 against rotation. A collar 172 conforming closely to the cross sectional shape of guard portion 168 is slidably mounted on said portion.

Ledger plate 162 has a downwardly extending rear flange 173 which has a central opening 173A to accommodate the rearwardly extending projection 167′ on the rear surface 167 of guard 161. The flange 173 is of such length as to terminate at the upper surface of rectangular guard portion 168. The cooperation of flange 173 with the projection 167′ prevents sideward movement of the ledger plate with respect to the guard 161. Hole 162A is provided to aid in the handling of ledger plate 162.

In assembling the structure shown in Figs. 14 through 17, the ledger plate 162 is placed on the guard with the opening in flange 173 of the ledger plate over projection 167′ on the guard. Collar 172 is then slid over the rear end of bolt 169 and pushed onto its rectangular portion 168, after which the bolt is inserted from front to rear into the cutter bar 160, and nut 170 is affixed to the bolt. As the nut 170 is tightened, collar 172 bears against the front surface of cutter bar 160, and against the rear surface of the lower portion of flange 173 of the ledger plate, thus preventing rearward movement of the ledger plate and holding it firmly in its forward position. Collar 172, in serving as a spacer between cutter bar 160 and the ledger plate, thus provides a space 175 for the reciprocating element which carries the cutting elements (not shown).

In order to replace a worn ledger plate, it is merely necessary to loosen nut 170 enough to permit slight forward movement of guard 161, thereby permitting the lower edge of flange 173 of the ledger plate to clear collar 172 as it is being removed.

All of the embodiments of the invention described above present important advantages over constructions now known and in use. In the present constructions, the guard fingers are generally fastened to the underside of a cutter bar with a bolt running from top to bottom and protruding from the bottom of the cutter bar and guard finger. Because of this fact, it is necessary in these known constructions to have on each end of the bar a shoe which raises the bar above the ground a distance of about two inches. This raising of the bar of course raises the cutting level, so that all of the foliage below about three inches above the surface of the ground is wasted. The extending bolts often become damaged to such an extent that they must be chiseled off when it is necessary to remove a guard finger. The removal of these fingers is often required, since it is necessary to remove a guard finger in order to replace the ledger plate which is riveted to it. The rivet holding the ledger plate must also be chiseled off and drilled out in order to permit removal of the plate. On a seven foot cutter bar, this procedure often requires twelve to fifteen hours of work, and the enormous weight of the bars now generally used, around 100 pounds, means that it is difficult for one man to do the job.

The various constructions described herein are of greatly reduced weight, usually weighing around 41 pounds, and because of their novel construction, they ride along the surface of the ground without the shoes which are used in the conventional constructions. This gives a closer cut, and eliminates crop wastage. The removal of ledger plates in my new construction can be accomplished in less than twenty minutes.

I recognize that the embodiments of the invention which I have shown are susceptible of numerous variations, such as the making of various of the elements either of integral parts or of welded parts, and it is to be understood that the modifications and embodiments which I have shown and described, are given only in an exemplary sense, and not in a limiting sense, since the scope of the invention is to be limited only by the appended claims.

I claim:

1. In a mower, reaper or the like of the reciprocating cutter means type, the combination of a cutter bar, at least one forwardly projecting guard finger adapted for mounting on the front of said bar, a ledger plate detachably mounted on said finger, said finger having a rear surface positioned adjacent the front of said cutter bar when in assembled position, said surface having a depression therein which is enlarged at its lower portion, said ledger plate having a depending rear portion approximately matching said depression in configuration, and attaching means for said finger adapted to pass from front to rear through said cutter bar to hold said rear surface of the finger and said ledger plate rear portion tightly against the front of said cutter bar, whereby relative disengaging movement between said ledger plate and said finger is prevented.

2. The arrangement set forth in claim 1, said attaching means comprising an integral rearward extension of said finger and having a front portion rectangular in cross section and a threaded cylindrical rear portion, said cutter bar having a matching rectangular opening in its front portion communicating with a circular opening in its rear portion to receive said extension.

3. The arrangement set forth in claim 2, said cutter bar being hollow, said openings being provided in its front and rear walls, respectively.

4. The arrangement set forth in claim 1, a tongue on the forward end portion of said ledger plate, and the corresponding portion of said finger having a cavity for receiving said tongue to prevent upward movement of the forward end of said ledger plate when in assembled position.

5. The arrangement set forth in claim 1, said finger having an upper guard element integral at its forward portion with the forward portion of the finger and extending in spaced relation above said ledger plate and above the front of said cutter bar, and a tongue at the rear end of said upper guard, said cutter bar having an opening in its upper surface for receiving said tongue.

6. The arrangement set forth in claim 1, said cutter bar being hollow, and having a depression in its upper front edge portion defining the bottom and rear walls of a groove to accommodate the cutter means, the rear surface of the depending rear portion of said ledger plate defining the front wall of the groove.

7. The arrangement set forth in claim 1, said attaching means including a bolt having an enlarged head, said finger having a hollow central portion open at the top to receive said bolt head and having a rear opening to receive the shank of the bolt, while preventing rearward movement of the bolt head, said depending portion of the ledger plate having a downwardly opening notch to receive the shank of the bolt.

8. The arrangement set forth in claim 1, said attaching means including a bolt having an enlarged head, said finger having a hollow central portion open at the top to receive said bolt head and having a rear opening to receive the shank of the bolt, while preventing rearward movement of the bolt head, said depending portion of the ledger plate having a downwardly opening notch to receive the shank of the bolt, said cutter bar having in its front surface an opening for receiving said bolt, a pair of other openings, one on each side of said bolt receiving opening, and projections on the rear surface of said finger for entering said pair of openings to prevent twisting of said finger relative to the cutting bar.

9. The arrangement set forth in claim 1, said attaching means including a bolt having an enlarged head, said finger having a hollow central portion open at the top to receive said bolt head and having a rear opening to receive the shank of the bolt, while preventing rearward movement of the bolt head, said depending portion of the ledger plate having a downwardly opening notch to receive the shank of the bolt, said depression having approximately an hourglass shape.

OTTO WANNEBO.

REFERENCES CITED

The following references are of record in the file of this patent:

UNITED STATES PATENTS

| Number | Name | Date |
|---|---|---|
| Re. 2,594 | Wheeler, Jr. | May 7, 1867 |
| 641,123 | Kukacka | Jan. 9, 1900 |
| 1,239,570 | Crawford | Sept. 11, 1917 |
| 1,396,997 | Crawford | Nov. 15, 1921 |
| 1,599,007 | Crawford | Sept. 17, 1926 |
| 2,483,212 | Leake | Sept. 27, 1949 |